US008680177B2

(12) United States Patent
Starling

(10) Patent No.: US 8,680,177 B2
(45) Date of Patent: Mar. 25, 2014

(54) POLYETHYLENE OR POLYMERIC POLYOL COMPOSITIONS AND METHODS FOR SAME

(75) Inventor: Shelly Starling, Lansdale, PA (US)

(73) Assignee: Rembrandt Shaving Technologies, LP, Bala Cynwyd, PA (US)

( * ) Notice: Subject to any disclaimer, the term of this patent is extended or adjusted under 35 U.S.C. 154(b) by 344 days.

(21) Appl. No.: 13/027,874

(22) Filed: Feb. 15, 2011

(65) Prior Publication Data

US 2011/0201723 A1    Aug. 18, 2011

Related U.S. Application Data

(60) Provisional application No. 61/304,733, filed on Feb. 15, 2010.

(51) Int. Cl.
*B01F 5/04* (2006.01)

(52) U.S. Cl.
USPC ............................ 523/319; 524/451; 524/612

(58) Field of Classification Search
USPC .................................. 523/319; 524/451, 612
See application file for complete search history.

(56) References Cited

U.S. PATENT DOCUMENTS 4,247,405 A * 1/1981 Wier ............................ 507/247

* cited by examiner

*Primary Examiner* — Edward Cain

(57) ABSTRACT

A combination of PEO and a liquid is formed using low frequency, high intensity vibration to achieve a high percentage of PEO. The liquid preferably is water. The invention is also application to PEO-like structures and polymeric polyols.

A solid or semi-solid composition, such as a putty, may be formed by combining a liquid, a filler, and at least 50 percent PEO by weight and vibrating the combination at low frequency, high intensity to achieve a combination having a high PEOP content. The invention is also application to PEO-like structures and polymeric polyols.

32 Claims, No Drawings

POLYETHYLENE OR POLYMERIC POLYOL COMPOSITIONS AND METHODS FOR SAME

CROSS-REFERENCE TO RELATED APPLICATIONS

This claims the benefit of U.S. Patent Application Ser. No. 61/304,733, filed Feb. 15, 2010, the disclosure of which is hereby incorporated by reference as if set forth in its entirety herein.

BACKGROUND

Polyethylene oxide (PEO), which is similar in chemical structure to polyethylene glycol (PEG) and polyoxyethylene (POE), is an oligomer or polymer of ethylene oxide. PEG generally refers to oligomers and polymers with a molecular mass below 20,000 g/mol, PEO to polymers with a molecular mass above 20,000 g/mol, and POE to a polymer of any molecular mass.

The state of PEO may depend on its molecular weight, but generally has the following structure:

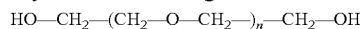

PEO is often sold or identified under the tradename POLYOX™ as a water-soluble resin. It is advertised as providing binding, thickening, lubricity, water retention, and film formation. It is considered to be a thermoplastic material that is readily calendered, extruded, injection molded, or cast. PEO is used commercially in pharmaceuticals, personal care and cleaning products, mining, building materials, and paper industries in various ways.

PEO has limited solubility in water, but easily drops out of solution. The difficulty in obtaining or maintaining a PEO-water solution is more difficult at higher molecular weight PEO. The table below provides the viscosity of various commercially available POLYOX products by molecular weight. The table below illustrates the difficulty of producing solutions of high PEO content as molecular weight increases. For a 5% (weight) PEO solution in water, the highest commercially feasible molecular weight POLYOX is 900,000. For a 2% (weight) PEO solution in water, the highest commercially feasible molecular weight POLYOX is 2,000,000. For POLYOX having a molecular weight of 7,000,000, commercially feasible weight percent of PEO above 1% are difficult, and in many applications even 1% PEO is not feasible.

| POLYOX No. | Approx. MW | Viscosity Range at 25 C., CP | | |
|---|---|---|---|---|
| | | 5% solution | 2% solution | 1% solution |
| WSR N-10 | 100,000 | 30-50 | | |
| WSR N-80 | 200,000 | 55-90 | | |
| WSR N-750 | 300,000 | 600-1,200 | | |
| WSR-205 | 600,000 | 4,500-8,800 | | |
| WSR-1105 | 900,000 | 8,000-17,000 | | |
| WSR N-12k | 1,000,000 | | 400-800 | |
| WSR N-60k | 2,000,000 | | 2,000-4,000 | |
| WSR-301 | 4,000,000 | | | 1,6500-5,500 |
| WSR Coagulant | 5,000,000 | | | 5,500-7,500 |
| WSR-303 | 7,000,000 | | | 7,500-10,000 |

There is a need for improved processes and compositions that enable application of PEO.

SUMMARY

A method of forming a PEO and water solution of greater PEO concentration than previously known and/or using lower molecular weight PEO than previously possible, and the corresponding composition of matter is provided.

A process for forming a PEO and water combination comprises the steps of: combining a liquid with at least 1% PEO; vibrating the combination at low frequency, high intensity, thereby creating a composition including water and PEO in which the tendency of the PEO to settle out of solution in high PEO is reduced. Preferably, the liquid is water and the PEO is at least 2%, or at least 5%, at least 10% of the combination.

Preferably, the PEO is a powder having a molecular weight between 100,000 and 7,000,000.

The vibration preferably is performed at between 15 and 1,000 hz, or between 50 and 100 hz. The amplitude of the vibrations are preferably between 0.02 and 0.5 inches.

The present invention encompasses the composition resulting from the process generally described herein, preferably comprising water and at least 1% percent, at least 2%, at least 5%, or at least 10% PEO.

Also, the present invention encompasses a process for forming a solid particles and liquid combination comprising the steps of: combining a liquid with at least 1% of a high molecular weight polymeric polyol powder into a combination, the combination having a tendency not to remain in solution; and vibrating the combination at low frequency, high intensity, thereby creating a composition in which the tendency of the polymeric polyol to settle out of solution is reduced.

Some drawbacks of PEO in a film matrix can be overcome by increasing the PEO content in a solid or semi-solid, such as a putty.

In this regard, a process of forming a solid or semi-solid composition comprises the steps of: combining a liquid, a filler, and at least 50 percent PEO by weight into combination, and vibrating the combination at low frequency, high intensity. Preferably, the liquid is water PEO is at least 60% of the combination, at least 70% of the combination, or at least 80% of the combination.

Preferably, the frequency is tuned approximately to a harmonic frequency of the combination and its container, and the vibrating step includes vibrating the combination at between 15 and 1,000 hz, or between 50 and 100 hz, and an amplitude of between 0.02 and 0.5 inches. Preferably, the filler comprises a powder, such as talc, and the composition consists essentially of water, the filler, and the PEO.

The present invention encompasses a semi-solid composition as generally described herein that comprises a filler, water, and at least 50% PEO by weight, at least 60%, at least 70%, or at least 80% of the combination.

The inventors have demonstrated the effectiveness of the present methods and the corresponding products using PEO. The inventors surmise that the present method would be applicable to substances having structure similar to PEO, such as to polyethylene glycol (PEG) and polyoxyethylene (POE). For ease of explanation, these substances are referred to in this disclosure as having a "PEO structure".

Further, the inventors surmise that the present method would be applicable to any polymeric polyol, such as polyethylene glycol; polypropylene glycol; poly(tetramethylene ether)glycol; polyethylene oxide; polypropylene oxide; a reaction product of glycerin and propylene oxide, ethylene oxide, or a combination thereof, a reaction product of a diol and a dicarboxylic acid or its derivative; a natural oil polyol; or any combination thereof.

The present invention encompasses any liquid in combination with PEO, a PEO-like structure, and a polymeric polyol. The liquids include, without limitation, oils, solvents, and the like.

DETAILED DESCRIPTION OF PREFERRED EMBODIMENTS

To form the composition, the ingredients, including PEO (or a PEO structure materials) and water, are subjected to low frequency, high intensity acoustic vibrations, preferably between 15 and 1,000 HZ, or between 50 to 100 Hz, having an amplitude of 0.02 to 0.5 inches. The supplier of equipment to vibrate the composition, Resodyn, owns U.S. Pat. No. 7,188,993, which is incorporated herein by reference in its entirety.

The second inventive composition is a mixture of PEO powder, a filler or agent powder, and water that is subjected to low frequency, high intensity acoustic vibrations, preferably between 15 and 1,000 HZ, or between 50 to 100 Hz, having an amplitude of 0.02 to 0.5 inches. The product is a compressible solid or putty having a high PEO content. Talc or baby powder has been used to produce a composition of approximately 80% by weight.

For the examples below, samples were prepared by mixing and then vibrated in a Resodyn Labram acoustic mixer, in accordance with the standard operating procedure of the machine. The compositions were determined to be successfully formed if the PEO and water became visually homogeneous. The criteria used to determine whether the composition remained in solution was a visual determination of whether the components separated into phases. The examples below became homogeneous and remained homogeneous for at least several hours.

Example 1

Two (2.0) ounces of water was combined with 0.2 ounces of POLYOX WSR 1105 (MW 900,000) were combined in a container and blended together in the acoustic mixer for two minutes.

Example 2

Two (2.0) ounces of water was combined with 0.2 ounces of POLYOX WSR Coagulant (MW 5,000,000) were combined in a container and blended together in the acoustic mixer for two minutes.

Example 3

Two (2.0) ounces of water was combined with 0.1 ounces of POLYOX WSR-303 (MW 7,000,000) were combined in a container and blended together in the acoustic mixer for two minutes.

Example 4

Four (4.0) ounces of POLYOX WSR-303 (MW 7,000,000) and 1.0 ounce of talc in a container and blended together in the acoustic mixer for two minutes. A small amount of water was added until the powder created agglomerations. The amount of water was not accurately measured, but was believed to be less than 10% of the total weight.

The inventors surmise that the combinations described herein may be used for various functions. For example, the putty and the composition directly as a lubricant, and in a controlled release system, tablet coating, Granulation, melting extrusion and melt coating, liquid preparation, mucosal bioadhesive, foam, and capsules. The present invention is not limited by the list of possible uses, but rather encompasses any function or use unless specifically recited in the claims.

The invention claimed is:

1. A process for forming a PEO and water combination comprising the steps of:
   combining a liquid with at least 1% PEO;
   vibrating the combination at low frequency, high intensity, thereby creating a composition including water and PEO in which the tendency of the PEO to settle out of solution in high PEO is reduced.

2. The process of claim 1 wherein the liquid is water.

3. The process of claim 1 wherein the PEO is at least 2% of the combination.

4. The process of claim 1 wherein the PEO is at least 5% of the combination.

5. The process of claim 1 wherein the PEO is at least 10% of the combination.

6. The process of claim 1 wherein the vibrating step includes vibrating the combination at between 15 and 1,000 hz.

7. The process of claim 1 wherein the vibrating step includes vibrating the mixture at between 50 and 100 hz.

8. The process of claim 1 wherein the vibrations of the vibrating step have an amplitude of between 0.02 and 0.5 inches.

9. The process of claim 1 wherein the PEO for the combining step is a powder.

10. The process of claim 1 wherein the PEO for the combining step has a molecular weight between 100,000 and 7,000,000.

11. The process of claim 1 wherein the composition of the combining step consists essentially of water and PEO.

12. A separation-resistant composition comprising water and more than 5% percent PEO.

13. The composition of claim 12 wherein the composition is at least 10% PEO.

14. The composition of claim 12 wherein the composition consists essentially of the water and the PEO.

15. A process for forming a solid particles and liquid combination comprising the steps of:
   combining a liquid with at least 1% of a high molecular weight polymeric polyol powder into a combination, the combination having a tendency not to remain in solution;
   and vibrating the combination at low frequency, high intensity, thereby creating a composition in which the tendency of the polymeric polyol to settle out of solution is reduced.

16. A process of forming a solid or semi-solid composition comprising the steps of:
   combining a liquid, a filler, and at least 50 percent PEO by weight into combination, and
   vibrating the combination at low frequency, high intensity.

17. The process of claim 16 wherein the liquid is water.

18. The process of claim 16 wherein the PEO is at least 60% of the combination.

19. The process of claim 16 wherein the PEO is at least 70% of the combination.

20. The process of claim 16 wherein the PEO is at least 80% of the combination.

21. The process of claim 16 wherein the frequency is tuned approximately to a harmonic frequency of the combination and its container.

22. The process of claim 16 wherein the vibrating step includes vibrating the combination at between 15 and 1,000 hz.

23. The process of claim 16 wherein the vibrating step includes vibrating the mixture at between 50 and 100 hz.

24. The process of claim 16 wherein the vibrations of the vibrating step have an amplitude of between 0.02 and 0.5 inches.

25. The process of claim 16 wherein the filler comprises a powder.

26. The process of claim 16 wherein the filler is talc.

27. The process of claim 16 wherein the composition consists essentially of water, the filler, and the PEO.

28. A semi-solid composition comprising a filler, water, and at least 50% PEO by weight.

29. The composition of claim 28 wherein the PEO is at least 60% of the combination.

30. The composition of claim 28 wherein the PEO is at least 70% of the combination.

31. The composition of claim 28 wherein the PEO is at least 80% of the combination.

32. The composition of claim 12, wherein the PEO has a molecular weight between 100,000 and 7,000,000.

\* \* \* \* \*